Patented June 25, 1940

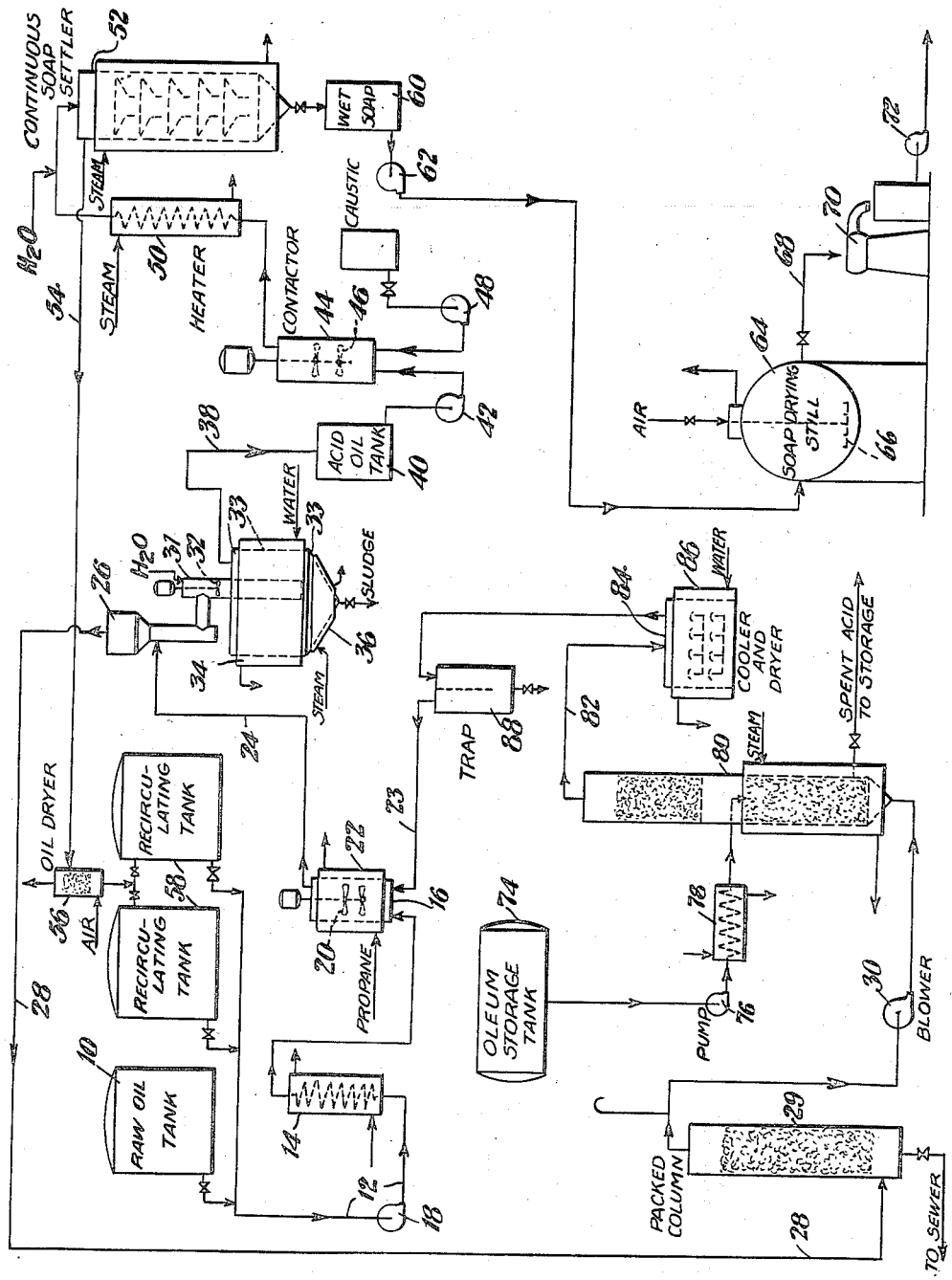

2,205,924

UNITED STATES PATENT OFFICE 2,205,924

LIQUID MINERAL OIL SULPHONATES AND PROCESS OF MANUFACTURE

Alfred Putnam Frame, Haddonfield, N. J., assignor to Charles E. Foster and Ernest V. Moncrieff, New York, N. Y., acting as trustees under the name of Oil Specialties Trustees Application February 25, 1937, Serial No. 127,675

7 Claims. (Cl. 260—504)

This invention relates to mineral oil composition, and more particularly to an improved liquid oil composition and process of manufacture.

A particular object of the invention is that of producing a liquid oil composition which is colloidally soluble in both water and oil, and which will form stable and permanent emulsions of oil in water.

Soaps which are emulsifying agents adapted for use as cutting oils, spray oils, textile oils and the like, have been heretofore manufactured largely by use of animal and vegetable oil bases. Such oils and soaps, however, are subject to rancidification and are accordingly chemically unstable. Mineral oil and emulsifying agents have also been heretofore manufactured, usually as by products in the refining of petroleum distillates with sulphuric acid. The oil soluble sulphonic acid compositions thus produced will emulsify mineral oil in water, but emulsions thus formed are not stable or permanent emulsions. Furthermore such mineral oil sulphonic acid compositions are not in general readily emulsifiable with cold water, or with hard waters containing alkaline earth salts in solution.

Another object of the present invention is to provide a liquid mineral oil composition which is readily emulsifiable with cold water and with hard water to produce stable and permanent emulsions.

A further object of the invention is to provide a method whereby improved mineral oil compositions may be produced economically and simply.

A still further object of the invention is to provide a new and improved process for sulphonating and sulphating mineral oils.

A feature of the invention rests in the discovery that mineral oil compounds possessing remarkable emulsifying properties can be produced by a treatment which imparts to the resulting compound the property of substantially equal solubility in oil and water. Basically the improved process of making such oil compounds contemplates reacting a mineral oil containing substantial proportions of naphthenic and aromatic hydrocarbons with dry sulphuric anhydride under conditions producing sulphonic acids and some sulphuric acid ester derivatives of the hydrocarbons treated in about the proportions which will impart to the neutralized and hydrolyzed product an approximately equal solubility in oil and in water.

With the above and other objects and features in view the invention consists in the improved liquid oil compositions and process of manufacture which is hereinafter described and more particularly defined by the accompanying claims.

In the following description of the invention reference will be made to the accompanying diagrammatic flow sheet depicting a preferred method of carrying out the sulphonation reaction on a continuous, as distinguished from a batch, cycle.

Broadly speaking the liquid oil compositions which form the subject of the present invention can be manufactured by intimately reacting a petroleum lubricating oil distillate containing naphthenic, aromatic and paraffinic hydrocarbon components (with the naphthenic and aromatic hydrocarbons predominating) with 1%–10% by weight of dry sulphuric anhydride, separating any sludge formed during such $SO_3$ treatment, neutralizing the residual acid treated oil containing both sulphonic acids and sulphuric acid esters by intimately mixing the acid oil with caustic solution in excess of the amount required to completely neutralize, and raising the temperature of the neutralized or alkaline solution to about 200° F. By careful control of the amount and concentration of alkaline reagent and the amount of water added, gravity separation of the resulting product from any unreacted oil can be effected, after which the product can be dried by distilling off its water content to produce a substantially anhydrous liquid product. The resulting dry liquid product contains a small amount of water (not to exceed 1%), about 50% by volume of $SO_3$ refined lubricating oil, and about 50% by volume of mineral oil sulphonates including small amounts of heavy mineral oil sulphates and hydroxy compounds formed by hydrolysis of sulphuric acid esters. The hydroxy, sulphate and sulphonic radicals are present in the product in approximately the proportions to make the dry liquid product equally soluble in oil and in water.

While the liquid product can be and has been manufactured by a batch process, the preferred method of manufacture is by a continuous process which will now be described:

Referring to the accompanying flow sheet, the oil to be sulphonated, which may for example be a neutral lubricating oil distillate of Gulf Coast sulphur mine crude oil having a viscosty of 200 seconds (Saybolt) at 100° F., is pumped from an oil tank 10 through a tube 12 and a water cooler 14 into a contact agitator 16. The cooler 14 can be normally operated as a water cooler adapted to lower the temperature of the charging oil to about 80° F., and the charging oil is introduced into the contactor 16 at a rate of about one to two gallons per minute by means of pump 18. The contactor 16 is provided with a motor driven agitator 20 and is also equipped with a cooling jacket 22 through which liquid propane or other refrigerating medium may be circulated to absorb the heat developed by reaction within the contactor. The oil which is introduced into the contactor is violently agitated while simultaneously introducing therein by pipe 23 a diluted mixture of dry $SO_3$ and dry air or other inert gas such as nitrogen. The sulphonating gas mixture is preferably proportioned and measured to contain between 0.5% and 10% by weight of dry $SO_3$ and the balance dry air. The normal practice is to employ a sulphonating mixture containing only 1%–2% of $SO_3$ based on the air, with about 2.5%–5% by weight of $SO_3$ based on the weight of oil under treatment.

From the contactor 16 the mixture of gases and of liquid products of reaction pass through a conduit 24 into a vapor separator 26, from the top of which the gases are conducted by a pipe 28 into a column 29 where any entrained liquids are removed, after which the gas may be discarded or may be taken up by a blower 30 for recirculation through the system. The acid oil and any sludge carried thereby passes downwardly through the vapor separator 26 into a chamber 31 provided with a motor driven agitator 32, and during the passage of the acid oil through the chamber 31 a small amount of water is added to the oil in the proportion of about 1% by volume of the oil. From the agitator chamber 31 the oil, water and sludge mixture passes downwardly into a settling chamber 33 provided in its upper portion with a water cooling jacket 34 and in its lower portion with a steam or other heating jacket 36. The temperature of the acid oil-sludge mixture in the settler 33 is preferably held in the neighborhood of 90° F. during the period when any sludge settles out of the oil by gravity separation. The steam jacket 36 serves to maintain the temperature of the sludge sufficiently high to permit of its discharge from the bottom of the settler in a fluid state. The sludge free acid oil overflows from the settler 33 through an overflow pipe 38 into an acid oil tank 40, from which the acid oil is withdrawn by a pump 42 and passed into a neutralizing contactor 44 provided with a motor driven agitator 46.

Aqueous sodium hydroxide is introduced into contactor 44 by a pump 48. The concentration of the sodium hydroxide solution may be as low as 6° Bé., and the rate of introduction of the alkali is controlled to effect complete neutralization of the acid oil within the contactor 44 with sufficient excess alkalinity to insure continued neutrality of the acid oil as partial hydrolysis takes place of sulphuric acid esters formed during the treatment of the oil with $SO_3$. The concentration of the alkaline solution is also chosen to provide sufficient water to effect hydrolysis of the mineral oil acid sulphates, and to provide an aqueous solution from which the reaction product will separate from the oil on heating and standing, without emulsification.

A preferred operation is to employ strong 30° Bé. caustic solution for neutralizing the acid oil in contactor 44, and to then add water to the oil mixture with intimate contact at the inlet to the settling apparatus in amount (about 7% by weight) sufficient to precipitate the sulphonates without emulsification.

From the contactor 44 the neutralized oil and sulphonate mixture flows through a heater 50 into the top of a steam-jacketed pan-type continuous settler 52 in which the neutralized oil-sulphonate mixture is maintained at a temperature of approximately 200° F. Under proper conditions of neutrality and water concentration, the excess oil in the mixture is separated from the reaction product and the latter solution settled in the bottom of the settler 52, while the oil is withdrawn from the top of the settler through a pipe 54 into a packed drying column 56 in which the oil is blown with air to remove moisture, after which the oil enters tanks 58 from which it can be withdrawn for recirculation through the contactor 22 in admixture with fresh untreated oil, by the pump 18.

The wet oil product which collects in the bottom of the settler 52 is drawn off into a tank 60 from which it is charged by a pump 62 into a drying still 64. The wet product is dried by heating it within the still 64 to a temperature of about 235° F. while blowing air thereinto through an air manifold 66 adjacent the bottom of the still. After dehydration the product is removed by a pipe 68 into a centrifugal separator 70 which clarifies it by separating therefrom any oil insoluble compounds, the purified dry product being passed to storage by means of a pump 72.

The $SO_3$ for treating the oil in the contactor 22 may be advantageously produced by passing a dry mixture of sulphur dioxide and air through a reaction chamber containing a catalyst (for example platinum black) at a temperature in the neighborhood of 600° F. However, the method of producing the $SO_3$ which is illustrated in the accompanying flow sheet is commercially practical when applied around a refinery where sulphuric acid of varying strength is always useable. According to the process illustrated in the accompanying flow sheet, the $SO_3$ is produced by withdrawing fuming sulphuric acid or 120% oleum from a storage tank 74 through an acid pump 76 and passing the oleum through a heater 78 where it may be heated to a temperature of 200° F. before being introduced into a steam jacketed packed $SO_3$ generating column 80 within which the acid flows downwardly and countercurrently to the circuit of inert gas which is blown therethrough from the blower 30. Spent acid (the sulphuric acid monohydrate) is withdrawn from the bottom of the tower to storage while the mixture of $SO_3$ and air which is removed from the top of the column 80 passes by a pipe 82 at a temperature of about 150° F. into a cooler and drier 84 provided with a water jacket 86. The mixture of air and $SO_3$ is cooled to a temperature of about 80°–90° while passing through the bubble cap trays within the cooler and drier 84. Cooler 84 is charged with 120% oleum before starting the generation of $SO_3$. This oleum then gives up its $SO_3$ until it comes to equilibrium with the air-$SO_3$ mixture bubbling through it. Any traces of acid carried by the air-$SO_3$ mixture are removed in this way. The cooled and dry gases pass from the cooler 84 into a trap 88 for separation of any entrained acid and then into the contactor 22 through the pipe 23.

The mineral oils which are treated with $SO_3$ to produce the oil product of the present invention are preferably lubricating oil distillates having a high percentage of naphthenic and aromatic hydrocarbons (40% to 75%) together with a smaller percentage of straight chain hydrocarbons consisting chiefly of paraffins. The naphthenic hydrocarbons usually make up 20% to 60% of the total distillate treated. Distillates which have been treated to make a satisfactory oil sulphonate product possess a specific gravity in the range .90-.99 at 60° F., a viscosity in the range 125-225 seconds at 100° F., a refractive index of .150-.156 at 20° C., a bromine addition number in the range .1-7.0, and a bromine substitution number of 14-18.5. The specific oil which is treated in accordance with the illustrated example possesses a flash point of 340-370° F., a fire point of 370-425° F., an aniline point of 79.2° C., a bromine addition number of 0.15, and a bromine substitution number of 18.15.

Suitable oil sulphonates can only be prepared in accordance with the present invention by treating the lubricating oil distillate with anhydrous $SO_3$. Sulphuric acid, no matter how concentrated, does not produce a satisfactory product. Apparently it is only when dry dilute $SO_3$ is employed that a suitable yield of product is produced with a minimum production of tars, polymer oils and sludge with use of not more than reaction proportions of $SO_3$ to yield an oil product of substantially equal solubility in oil and in water. The bases which are employed for neutralizing the sulphonic acids are preferably those forming water soluble salts, such for example as caustic soda and sodium carbonate and caustic potash.

The oil sulphonate product should contain about 1% of water to impart maximum oil solubility. The dry product when properly made will make up in dilute water solution to a substantially clear solution. The sulphonate portion of the product prepared as above described possesses an average molecular weight of 400-425, an average carbon-hydrogen ratio of about 1:1.3-1.5, a sulphur content of about 7% by weight, a sodium content of about 5% by weight, and a sulphur-oxygen ratio of about 1 to 3½. The oil component of the product has an aniline point of 91.8° C., a bromine addition number of −1.64, and a bromine substitution number of 3.97. In general the oil products of the present invention should contain between 25 and 50% of sulphonate compounds and 50 to 75% of $SO_3$ refined oil. Sufficient oil should always be present to make the product liquid at normal air temperature in order to render the same emulsifiable with cold water.

In general the cutting oil bases and emulsions which are produced with the oil product herein described are characterized by great stability and a high degree of colloidal dispersion. The high emulsifying properties of the oil sulphonate are believed to be due in large part to the presence in the sulphonate of a large proportion of high molecular weight hydrocarbon sulphonates (average 400-475), together with a very small proportion of alkali sulphates (under 2.5%), and some high molecular weight hydrocarbon sulphates and alcohols.

In treating with $SO_3$, great care must be taken to hold the reaction temperature within carefully controlled limits, and it is chiefly for this reason that the $SO_3$ is diluted with a large excess of air or inert gas such as nitrogen or carbon dioxide or methane. The reaction should normally be carried out at a temperature within the range 60°-100° F. and under normal atmospheric pressure.

The invention having been thus described, what is claimed as new is:

1. A liquid mineral oil composition comprising a solution of about 50% by volume of $SO_3$ refined lubricating oil and about 50% by volume of oil and water soluble mineral oil sulphonate-sulphate derivatives, said composition being soluble to a substantially clear solution in water, and the sulphonate-sulphate portion of the composition having an average molecular weight of 400-425, an average C—H ratio of about 1:1.3-1.5, a sulphur content of about 7% by weight, and a sulphur-oxygen ratio of about 1 to 3½.

2. A liquid mineral oil composition comprising a solution of about 50% by volume of $SO_3$ refined lubricating oil, about 49% by volume of oil and water soluble mineral oil sulphonate-sulphate derivatives and about 1% by volume of water, the oil component of said composition having a much higher aniline point and lower bromine addition and substitution numbers than the oil from which the composition is produced, and the sulphonate-sulphate soap portion of the oil composition having an average molecular weight of 400-500, an average carbon hydrogen ratio of about 1:1.3-1.5, and a sulphur-oxygen ratio of about 1 to 3½.

3. In the manufacture of liquid mineral oil sulphonates, the steps comprising reacting a mineral lubricating oil of about 200 seconds Saybolt viscosity at 100° F. and containing upwards of 50% naphthenic-aromatic hydrocarbons with 1%-10% by weight of dry $SO_3$ at a temperature of 60°-90° F. in the presence of a gaseous diluent, separating any sludge formed and admixing with the acid oil strong aqueous solution of caustic alkali in excess of the amount required to neutralize the acidity of the oil, heating the mixture to a temperature of about 200° F. and adding about 7% by weight of water to precipitate the sulphonate product, separating excess oil from the sulphonate product by decantation, drying the sulphonate product by heating it to a temperature above the boiling point of water, and purifying the sulphonate product by centrifuging.

4. The process of producing a product containing at least 25% of mineral oil sulphonates including sulphonated naphthenic and aromatic hydrocarbons, which comprises intimately contacting a lubricating oil distillate containing at least 50% of naphthenic and aromatic hydrocarbons with dry $SO_3$ in a contact zone in the presence of an inert gaseous diluent at a temperature within the range of from 60° to 10..° F., separating the inert gas from the treated distillate, drying and recycling the inert gas back to the contact zone, separating sludge from the treated oil mixture, neutralizing and hydrolyzing the treated oil mixture with aqueous caustic alkaline solution and separating the resulting reaction product from the unreacted oil, and thereafter recycling the separated unreacted oil in admixture with fresh oil through the $SO_3$ contact zone in a continuous treating operation.

5. The process as defined in claim 4 in which the separated product is heated and air-blown to dry the product and lower its moisture below about 1%, after which the dry product is cleaned up to remove insoluble impurities.

6. In the manufacture of liquid mineral oil sulphonates, the steps comprising reacting a mineral lubricating oil of about 200 seconds Saybolt viscosity at 100 F. and having an aniline point of about 80° C., a bromine substitution number of about 18 and a bromine addition number of .15, with 1%-10% of its weight of dry $SO_3$ at a temperature of 60° F.-90° F. in the presence of a gaseous diluent, separating any sludge formed and adding to the acid oil an excess of caustic soda, heating the resulting alkaline mixture to a temperature of about 200° F. and hydrating it with sufficient water to precipitate the sulphonate product, separating excess oil from the sulphonate product and drying the product by heating it to a temperature above the boiling point of water.

7. The process of producing a sulphonated mineral oil product containing at least 25% of sulphonated hydrocarbons, which comprises intimately contacting a lubricating oil distillate containing at least 50% of naphthenic and aromatic hydrocarbons with dry $SO_3$ in the presence of an inert gaseous diluent at a temperature within the range of approximately 60° to 100° F. in a contact zone, removing the inert gas from the contact zone, separating sludge from the treated oil, neutralizing and hydrolyzing the treated oil with aqueous caustic alkaline solution and separating the resulting sulphonated product from any unreacted oil.

ALFRED PUTNAM FRAME.

CERTIFICATE OF CORRECTION.

Patent No. 2,205,924. June 25, 1940.

ALFRED PUTNAM FRAME.

It is hereby certified that error appears in the printed specification of the above numbered patent requiring correction as follows: Page 3, first column, line 60, for the word "sulphonate" read --product--; same page second column, line 23, claim 2, for "soap" read --composition--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.

CERTIFICATE OF CORRECTION.

Patent No. 2,205,924. June 25, 1940.

ALFRED PUTNAM FRAME.

It is hereby certified that error appears in the printed specification of the above numbered patent requiring correction as follows: Page 3, first column, line 60, for the word "sulphonate" read --product--; same page second column, line 23, claim 2, for "soap" read --composition--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.